United States Patent
Bajaj et al.

(10) Patent No.: US 9,104,469 B2
(45) Date of Patent: Aug. 11, 2015

(54) SUSPEND-RESUME OF VIRTUAL MACHINES USING DE-DUPLICATION

(71) Applicant: VMware, Inc., Palo Alto, CA (US)

(72) Inventors: Rupesh Bajaj, Bangalore (IN); Abhishek Bagchi, Bangalore (IN); Satbir Singh Bhatti, Assam (IN); Jitender Rohilla, Bangalore (IN); Mukul Sharma, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 239 days.

(21) Appl. No.: 13/914,931

(22) Filed: Jun. 11, 2013

(65) Prior Publication Data

US 2014/0366019 A1 Dec. 11, 2014

(51) Int. Cl.
| | |
|---|---|
| *G06F 9/455* | (2006.01) |
| *G06F 9/46* | (2006.01) |
| *G06F 9/48* | (2006.01) |
| *G06F 11/14* | (2006.01) |

(52) U.S. Cl.
CPC ............ *G06F 9/461* (2013.01); *G06F 9/45558* (2013.01); *G06F 9/4856* (2013.01); *G06F 11/1453* (2013.01); *G06F 2009/45575* (2013.01)

(58) Field of Classification Search
None
See application file for complete search history.

(56) References Cited

U.S. PATENT DOCUMENTS 8,307,177 B2 * 11/2012 Prahlad et al. ................. 711/162
8,751,763 B1 * 6/2014 Ramarao ....................... 711/162

* cited by examiner

*Primary Examiner* — Qing Wu (57) ABSTRACT

A technique for data de-duplication is applied to suspend and resume operations for virtual machines (VMs) to reduce the time needed to suspend or resume a virtual machine and store the suspended VMs in a space-efficient and time-efficient manner. A VM's state is serialized and written to disk in the form of key values that are used to retrieve data from a key-data map. The key-data map stores unique data blocks for suspended VM images. The key-data map can be stored in a solid-state drive to further reduce latency and access time.

29 Claims, 5 Drawing Sheets

SUSPEND-RESUME OF VIRTUAL MACHINES USING DE-DUPLICATION

BACKGROUND

In virtualized computer systems, it may be desirable in certain circumstances to suspend a virtual machine (VM) and resume it at a later time. This causes the VM execution to halt and the VM's state to be serialized and written to a file, commonly known as a checkpoint file or a suspend file.

Conventional approaches to suspending a VM can incur many costs in time, including the time needed to stop virtual CPUs of the VM, which increases with more virtual CPUs and virtual CPU load in the guest operating system; the time needed to flush in-flight I/O operations inside a guest operating system, which increases with more outstanding I/O operations and with higher latency of the disk attached to the guest operating system; the I/O latency of the disk where a persistent image of the guest RAM is getting stored; and disk space needed for the persistent storage of the guest RAM. As such, suspending a VM may take a long time to write out the VM's state to a file and might require a large amount of disk space.

SUMMARY

One or more embodiments of the present disclosure provide a VM suspend/resume method that uses data de-duplication to quickly suspend and resume a VM and efficiently use disk space provided by the VM's host computer system. With this method, large amounts of disk space of the host's storage system are saved, as well as time spent processing read and write I/O operations to store the data in the storage system as duplicate data need not be stored. Also, with this method, the number of disk read and write I/O operations are reduced drastically.

One or more embodiments disclosed herein provide a method, computer program product, and computer system for suspending a virtual machine executing in a physical host. In one embodiment, a method includes suspending execution of a virtual machine having data stored in a virtual memory space allocated for the virtual machine, and dividing the data in the virtual memory space into a plurality of blocks. The method further includes determining a plurality of keys corresponding to data in the plurality of blocks, and storing the plurality of keys in a key-data map that associates each of the plurality of keys with corresponding data from the plurality of blocks. The method includes generating, on a storage device, a saved state file comprising the plurality of keys, wherein the saved state file represents a state of the virtual memory space of the suspended virtual machine.

BRIEF DESCRIPTION OF THE DRAWINGS

So that the manner in which the above recited aspects are attained and can be understood in detail, a more particular description of embodiments of the present disclosure, briefly summarized above, may be had by reference to the appended drawings.

DETAILED DESCRIPTION

Embodiments of the present disclosure provide an improved technique for suspending and resuming a virtual machine that utilizes a data de-duplication technique. As used herein, data de-duplication refers to a process of finding a common data within a given data. Once duplicate data is found in a given data set (e.g., VM state data), the duplicate data need not be stored, only the unique data is stored, and a reference to the unique data is maintained while storing the given data. As a result, this method saves a lot of disk space when suspending VMs, as well as saving time spent processing read and write I/O operations to store the data over a storage system as duplicate data may not be stored. Further, this method reduces the number of disk read and write I/O operations to store the data within the storage system as duplicate data is written only once.

Figure 1:
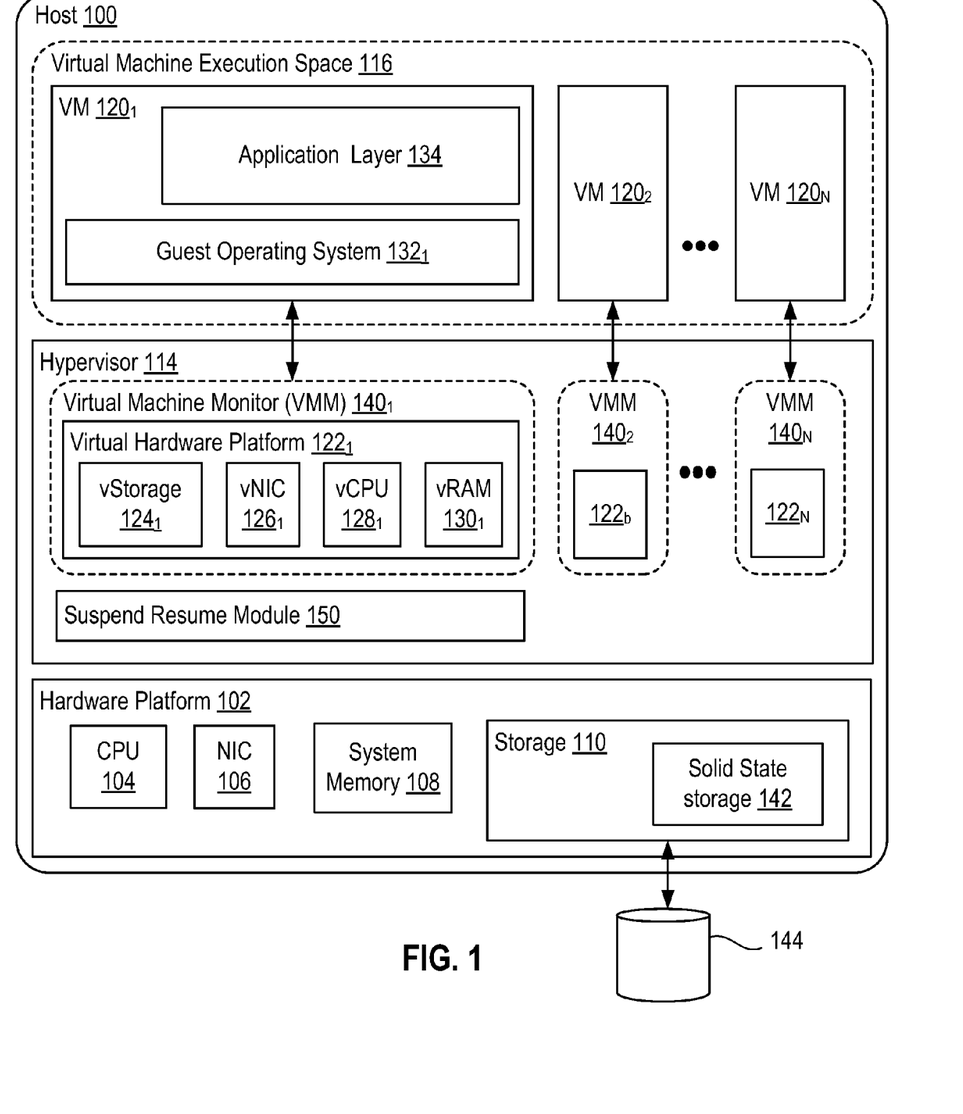
FIG. 1 is a block diagram that illustrates a computing system with which one or more embodiments of the present disclosure may be utilized.

FIG. 1 depicts a block diagram of a virtualized computer system in which one or more embodiments of the invention may be practiced. Host computer system 100 may be constructed on a desktop, laptop or server grade hardware platform 102 such as an x86 architecture platform. Hardware platform 102 includes one or more CPUs 104, a network adapter (NIC 106), system memory 108, and other I/O devices such as, for example, a mouse and keyboard (not shown).

Data storage 110 for host computer 100 may be served by a storage system 144. In some embodiments, storage system 144 may include one or more mass storage devices, such as hard disk drives, connected to host computer 100 via a native storage interface, such as a Serial ATA (SATA) interface, Serial Attached SCSI (SAS), or other suitable native storage interface. In other configurations, storage system 144 may include one or more storage arrays (e.g., disk arrays) of a storage array network (SAN) connected to host computer 100 via a network enabled storage interface such as FibreChannel, Internet Small Computer system Interface (iSCSI), or other suitable network enabled storage interface. In other embodiments, storage system 144 may be a network attached storage (NAS). According to one embodiment, storage 110 for host computer 100 includes one or more storage devices configured to have a lower latency and faster access time than storage system 144, depicted in FIG. 1 as a solid-state storage 142, also referred to as a solid-state device, solid-state disk, or solid-state drive (SSD). Though solid-state storage 142 is depicted in FIG. 1 as a local device, in other embodiments, solid-state storage 142 may be a shared device accessible by multiple host computers including host computer 100.

A virtualization software layer, also referred to hereinafter as hypervisor 114, is installed on top of hardware platform 102. Hypervisor 114 supports virtual machine execution space 116 within which multiple VM processes may be concurrently executed to instantiate VMs $120_1$-$120_N$. For each of VMs $120_1$-$120_N$, hypervisor 114 manages a corresponding virtual hardware platform (i.e., virtual hardware platforms $122_1$-$122_N$) that includes emulated hardware such as virtual hard drive $124_1$, virtual NIC $126_1$, virtual CPU $128_1$ and virtual RAM (interchangeably referred to as guest physical RAM or vRAM) $130_1$ for VM $120_1$. For example, virtual hardware platform $122_1$ may function as an equivalent of a standard x86 hardware architecture such that any x86 supported operating system, e.g., Microsoft Windows®, Linux®, Solaris® x86, NetWare, FreeBSD, etc., may be installed as guest operating system $132_1$ to execute any supported application in application layer 134 for VM $120_1$. Device driver layers in guest operating system $132_1$ of VM $120_1$ includes device drivers (not shown) that interact with emulated devices in virtual hardware platform $122_1$ as if such emulated devices were the actual physical devices. Hypervisor 114 is responsible for taking requests from such device drivers and translating the requests into corresponding requests for real device drivers in a device driver layer of hypervisor 114. The device drivers in device driver layer then communicate with real devices in hardware platform 102.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate from VMMs $140_1$-$140_N$, and VMMs $140_1$-$140_N$ may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

As in many computers, address space of system memory 108 is partitioned into pages (as referred to in an x86 architecture) or other analogous units. Applications then address system memory 108 using virtual addresses, which include virtual page numbers (VPN). The virtual addresses are mapped to physical addresses, having physical page numbers (PPN), which are used to address system memory 108, sometimes referred to as physical memory, host physical memory, or machine memory. An extra level of address indirection is typically implemented in virtualized systems, such as host computer 100 in FIG. 1, where a VPN issued by an application executing in application layer 134 in a VM 120 is remapped twice in order to determine which page of system memory 108 is intended. The first mapping is provided by a mapping module within guest OS 132, which translates a guest VPN (GVPN) into a corresponding guest PPN (GPPN) in the convention manner. From the guest OS's perspective, the GPPN are directly addressing machine memory, when in fact it is not.

A memory management module, located in each VMM $140_1$-$140_N$ in some embodiments, performs a second mapping by taking a GPPN issued by the guest OS 132 and mapping the GPPN to a hardware page number, sometimes referred to as a machine page number (MPN), that can be used to address system memory 108. In other embodiments, this GPPN-to-MPN mapping may instead be done in a lower-level mapping module of hypervisor 114. From the perspective of the guest OS, the GVPN and GPPN may be virtual and physical page numbers just as they would be if the guest OS were the only OS in the system. From the perspective of the host computer, the GPPN is a page number that is then mapped into the physical memory space of the hardware memory as a PPN.

In one embodiment, hypervisor 114 includes a suspend-resume module 150 configured to pause operations of a VM (e.g., VM $120_1$) and capture the state of the paused VM and the state of the VM's virtual hardware platform $122_1$, including the state of vRAM $130_1$. As described above, serializing and writing a VM's state to a file incurs a number of costs, include the time spent processing many read and write I/O operations (including I/O latency) for storage system 144 where a serialized state of vRAM $130_1$ is being persisted, and disk space needed for the persistent storage of the serialized state of vRAM $130_1$. Suspend-resume module 150 is configured to identify common data across images of VMs, e.g., VM $120_2$ to $120_N$, when suspended, store only the unique data, and keep references to the unique data for instances of duplicate data. In one embodiment, suspend-resume module 150 may be configured to identify data in guest physical memory (e.g., vRAM $130_1$) of a suspended VM that is common to data in serialized guest RAM of other suspended VMs.

Figure 2A:
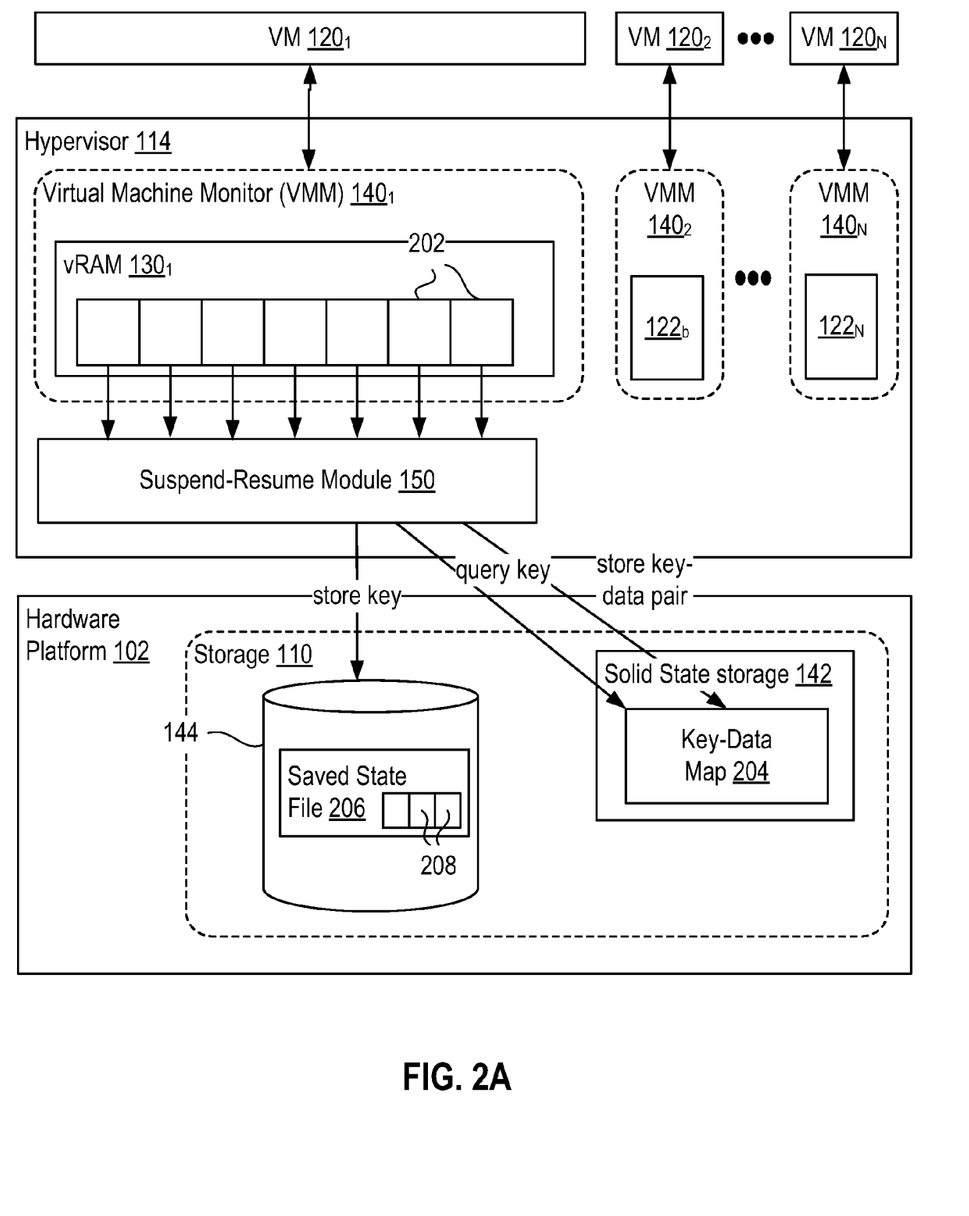
FIGS. 2A and 2B illustrate the methods of suspending and resuming a virtual machine according to one or more embodiments of the present disclosure.
Figure 2B:
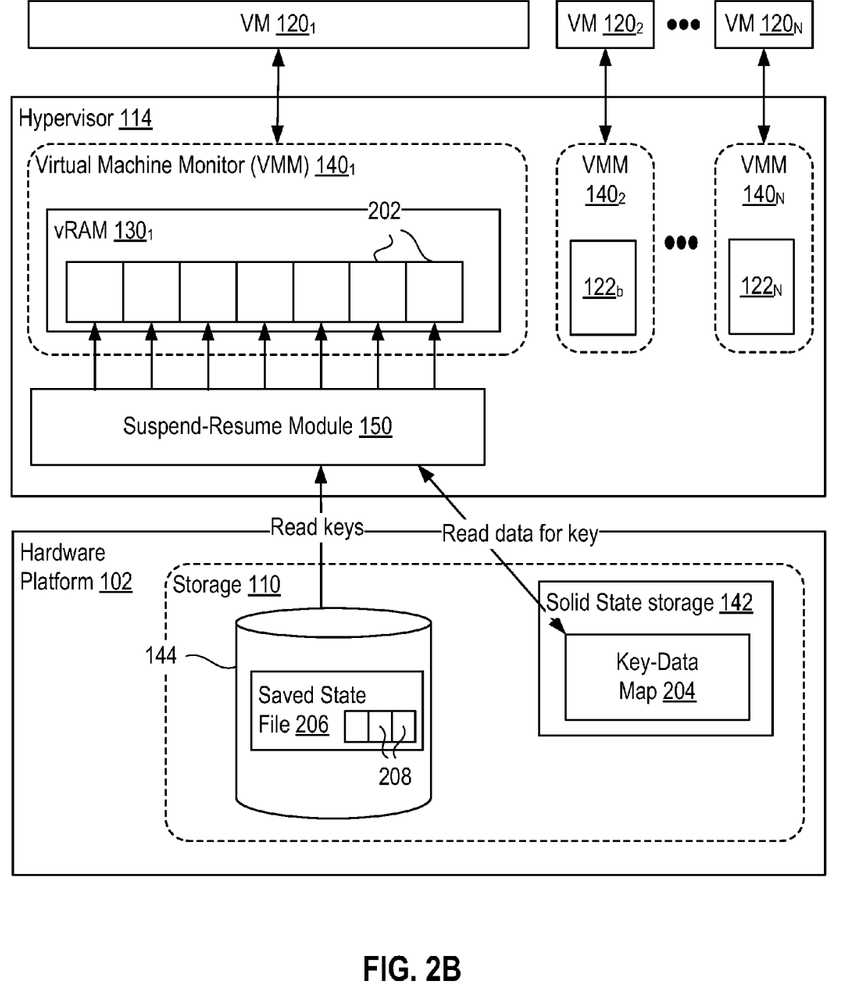

FIGS. 2A and 2B illustrate the methods of suspending and resuming a virtual machine according to one or more embodiments of the present disclosure. When suspending a virtual machine (e.g., VM $120_1$), all data related to the current state of the VM is serialized and persisted within storage 110. As shown in FIG. 2A, suspend-resume module 150 divides the vRAM $130_1$ image into same-size units of data referred to herein as blocks 202. For each block 202, suspend-resume module 150 calculates a hash value, referred to herein as a key 208, using data of each block. In one embodiment, suspend-resume module 150 generates a digest value by hashing data of each block using any of known hashing functions, including SHA-1, SHA-256, and MD5 message-digest algorithm. The hash values are configured to allow suspend-resume module 150 to quickly compare data in blocks 202 for potential equivalences.

According to one embodiment, suspend-resume module 150 uses a centralized entity, a key-data map 204, to maintain a mapping between each block of data and a corresponding key 208 associated with the block of data. Key-data map 204 is configured to associate each of the plurality of keys 208 with corresponding data from the plurality of blocks 202. In some embodiments, key-data map 204 stores data that is common across suspended VMs executing on a same host (e.g., VMs $120_1$ to $120_N$). In the embodiment shown in FIG. 2A, key-data map 204 is stored within a solid-state storage 142 such that read and write latency is reduced in comparison to storing key-data map 204 in a disk drive.

According to one embodiment, key-data map 204 is configured to, given a key value, return data corresponding to the key value. Key-data map 204 is further configured to, given a pair of key 208 and data block 202, store the block of data 202 within key-data map 204 for the given key 208. Key-data map 204 may be configured to store the block of data 202 for a given key only if the key 208 is not already stored within key-data map 204. As such, key-data map 204 may be configured to store only unique blocks of data.

In one embodiment, key-data map 204 is configured to, given a particular key 208, search within the key-data map and determine whether the particular key is already stored in key-data map 204. In some embodiments, a copy of keys 208 may be stored in memory (e.g., memory 108) such that the search operation does not result in a costly I/O disk read. In some embodiments where the number of keys 208 in key-data map 204 may be too numerous to all be kept in memory, suspend-resume module 150 may use a "page-fault"-type mechanism to store frequently-searched keys in memory and access less frequently searched keys in a "virtual" memory. In one particular implementation, key-data map 204 may include a Bloom filter attached to a "B+"-tree-based indexing structure to further reduce lookup time within key-data map 204, though other data structures may be used.

As shown in FIG. 2A, instead of saving the entire image of vRAM $130_1$ to disk, suspend-resume module 150 saves keys 208 for each data block 202 in vRAM $130_1$ into a saved state file 206. Saved state file 206 is configured to store the state of a suspended virtual machine. In some embodiments, saved state file 206 may be a set of one or more files (e.g., .vmss file) having data and metadata that represent a state of the virtual machine at a particular time. In one embodiment, saved state file 206 includes a listing of an address (i.e., GPPN) that defines part of the VM's virtual memory space and a corresponding key 208 that may be used to retrieve data for that memory page from key-data map 204. In another embodiment, saved state file 206 may include an array of keys 208 arranged sequentially based on a corresponding address (i.e., GPPN) that defines the part of the VM's virtual memory space, such that a given GPPN can be retrieved based on the index of the corresponding key. By saving just keys 208 and not corresponding data of vRAM to file, embodiments of the present disclosure reduce the amount of disk space needed to persist the vRAM image and also reduce the amount of write I/O operations (and subsequent time spent processing the I/O operations) as well as time required to suspend a VM.

In FIG. 2B, suspend-resume module 150 resumes operation of VM $120_1$. To resume VM $120_1$, suspend-resume module 150 reads keys 208 for each block from saved state file 206, and then retrieves data for blocks 202 from key-data map 204 using keys 208. As shown, suspend-resume module 150 populates vRAM $130_1$ using data for blocks 202, and resumes VM $120_1$.

Figure 3:
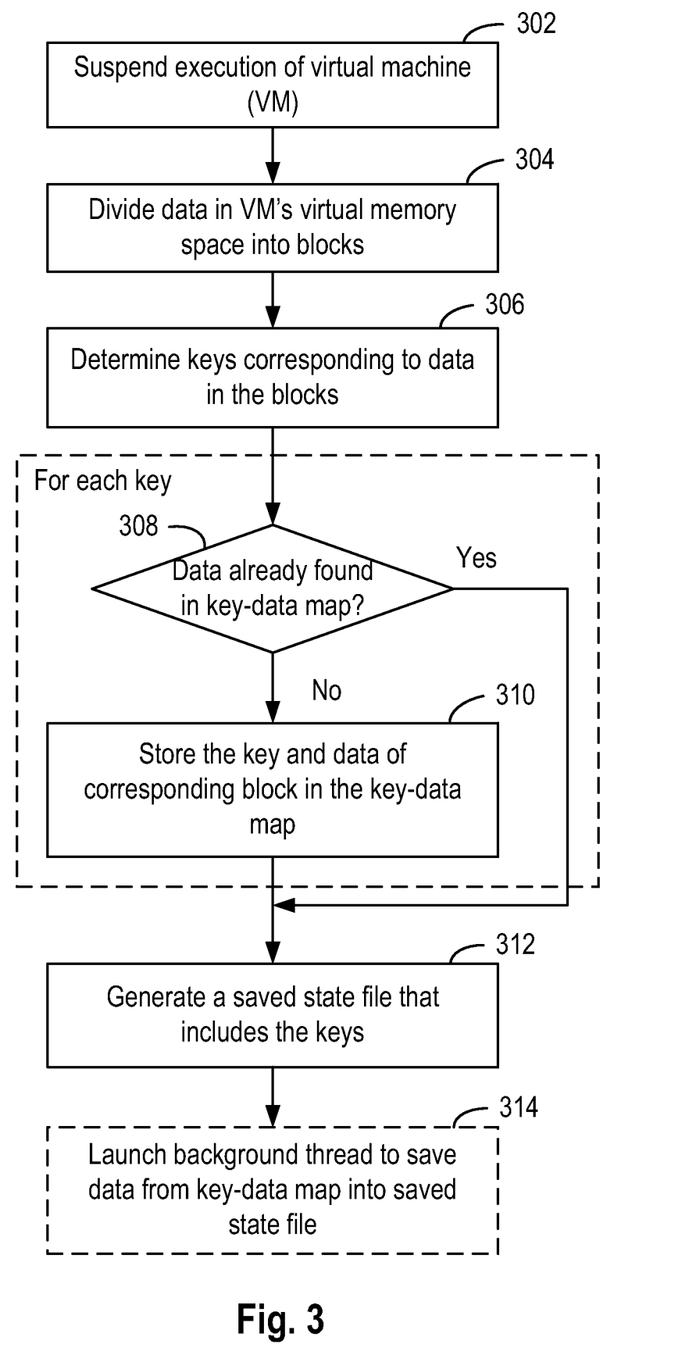
FIG. 3 is a flow diagram that illustrates steps for a method for suspending a virtual machine, according to an embodiment of the present disclosure.

FIG. 3 is a flow diagram that illustrates steps for a method for suspending a virtual machine, according to an embodiment of the present disclosure. The method begins at step 302, where suspend-resume module 150 suspends execution of a virtual machine. This may include quiescing virtual components of the virtual machine, including stopping vCPUs (e.g., vCPU $128_1$), flushing in-flight I/O operations inside the guest operating system to storage (e.g., to vStorage $124_1$), and pausing access operations to vRAM (e.g., vRAM $130_1$).

At step 304, suspend-resume module 150 divides data in a virtual memory space of the virtual machine into a plurality of blocks 202. In one embodiment, vRAM 130 defines a virtual memory space for a given VM and, in some embodiments, data within the virtual memory space may be accessed using a plurality of GPPNs, described above. In some embodiments where the virtual memory space (e.g., vRAM $130_1$) is organized in memory pages, the plurality of blocks 202 may have a same size as the memory pages of vRAM. In one particular implementation, each block 202 has a size of 4 kb, though other sizes may be used.

At step 306, suspend-resume module 150 determines a plurality of keys 208 corresponding to data in the plurality of blocks. In some embodiments, suspend-resume module 150 generates for each of the plurality of blocks, a hash value based on data in the corresponding block 202. In some embodiments, suspend-resume module 150 determines the hash value using a page-sharing module in hypervisor 114 that may have already calculated the hash value for a memory page as part of page-sharing according to known memory management techniques. In such an embodiment, suspend-resume module 150 queries the page-sharing module using a GPPN associated with a particular block 202 of vRAM, and obtains a hash value corresponding to the GPPN.

For each key of the plurality of keys, at step 308, suspend-resume module 150 queries key-data map 204 to determine whether key-data map 204 already has data associated with the key. If so, suspend-resume module 150 proceeds to include the key within a saved state file 206. Otherwise, at step 310, suspend-resume module 150 stores the key and data of the corresponding block 202 in key-data map 204, and includes the key within the saved state file.

At step 312, suspend-resume module 150 generates saved state file 206 that represents a state of the virtual memory space of the suspended virtual machine. The saved state file includes the plurality of keys 208, which were inserted in steps described above. In one embodiment, the saved state file is stored in a storage device different from the storage system storing the key-data map.

In some embodiments, at step 314, suspend-resume module 150 may optionally launch a background thread to save data from key-data map 204 into saved state file 206 over time. The background thread reads keys from saved state file 206, query the key-data map, and write data obtained from the key-data map to the saved state file. As such, over a period of time, the background thread populates the saved state file with the data of the blocks 202, such that the saved state file now has the plurality of keys as well as the corresponding data from blocks 202. The background thread thereby enables the virtual machine to be resumed on another host, which may not have access to key-data map 204, as described later.

Figure 4:
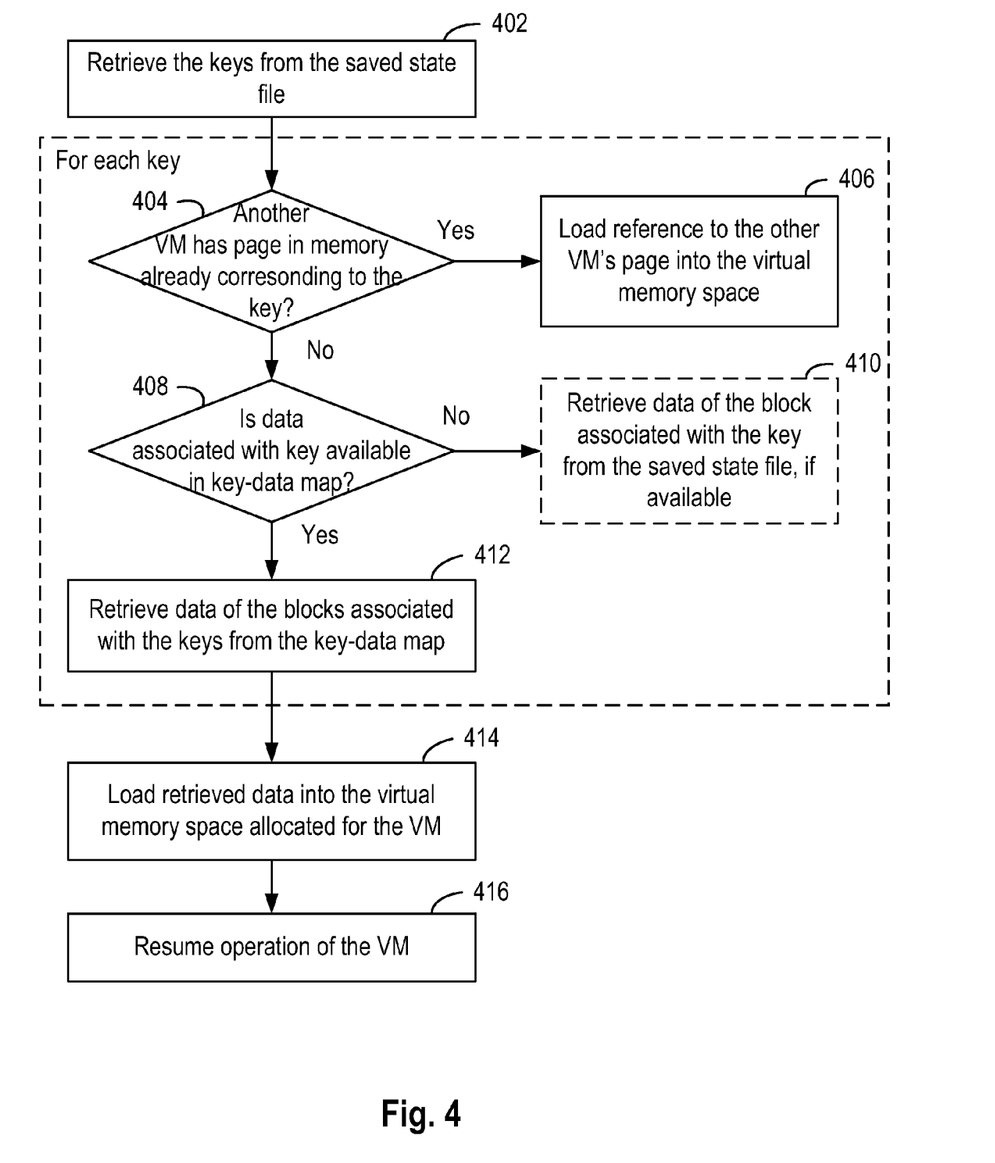
FIG. 4 is a flow diagram that illustrates steps for a method for resuming a virtual machine, according to an embodiment of the present disclosure.

FIG. 4 is a flow diagram that illustrates steps for a method for resuming a virtual machine, according to an embodiment of the present disclosure. The method begins at step 402, where suspend-resume module 150 retrieves the plurality of keys 208 from the saved state file representing the state of the virtual memory space of the suspend machine.

For each key of the plurality of keys, at step 404, suspend-resume module 150 determines whether another virtual machine executing on the host has a page in memory having the same data contents one of the blocks based on a corresponding key. In some embodiments, suspend-resume module 150 queries the in-memory keys to check whether any other VM in the host has the same key such that the data of that key can be used, for example, through sharing the memory page that VM has. If so, suspend-resume module 150 loads a reference to the other virtual machine's memory page into the virtual memory space, instead of loading data from the key-data map.

Otherwise, at step 408, suspend-resume module 150 queries key-data map 204 to determine whether data associated with the key is available within the key-data map. If available, at step 412, suspend-resume module 150 retrieves data of the plurality of blocks associated with the plurality of keys from the key-data map.

At step 414, suspend-resume module 150 loads the retrieved data into the virtual memory space allocated for the virtual machine. In some embodiments, suspend-resume module 150 updates vRAM $130_1$ with the retrieved data. At step 416, suspend-resume module 150 resumes operation of the virtual machine. In some embodiments, suspend-resume module 150 may execute a "lazy resume" operation, whereby keys 208 are read from the saved state file and block data are retrieved from key-data map 204 as required. Under a "lazy" resume operation, the VM is resumed before any of a VM's vRAM has been pre-fetched and loaded from key-data map 204 using keys 208. When there is a page fault from the VM (i.e., for any pages that the now-running VM accesses that have not been pre-fetched or paged-in yet), suspend-resume module 150 reads data from key-data map 204 using its corresponding key, and updates the requested page in vRAM accordingly. In some embodiments, the lazy resume operation may pre-fetch and load a pre-determined quantity or percentage of a VM's vRAM from key-data map 204 using keys 208 before resuming operation of the VM, and then load additional vRAM data from key-data map 204 when there is a page fault.

Referring back to step 408, if for some reason data corresponding to a given key is not found within key-data map, then at step 410, suspend-resume module 150 may retrieve data of the blocks associated with the key from the saved state file, if available. As mentioned earlier, in some embodiments, a background thread may populate saved state file 206 with data from key-data map 204 after the virtual machine has been suspended. In such embodiments, the suspended virtual machine may be resumed on a host (i.e., Host B) different from the host on which the virtual machine was suspended (i.e., Host A), and on which data from blocks 202 may not be available within Host B's own key-value map or on a host on which key-value map is not present. Therefore, to resume the virtual machine on Host B, suspend-resume module 150 still queries the key-data map of Host B using the keys retrieved from the saved state file. If data is available from the key-data map of Host B, suspend-resume module 150 reads data from the key-data map of Host B, for example as in step 412. Otherwise, suspend-resume module 150 reads the data from the saved state file, as in step 410. In an alternative embodiment, responsive to data not being available from the key-data map of Host B, Host B may contact Host A (e.g., via corresponding suspend-resume modules 150 or other suitable agents) to obtain the missing data of blocks 202 from the key-data map of Host A using the keys saved in a saved state file 206. Accordingly, certain embodiments of the present disclosure enable one host to resume a virtual machine that was suspended on a different host.

While FIG. 1 depicts a single key-data map 204 shared across all VMs in a single host computer 100, it should be recognized that aspects of the present disclosure can be extended to share a key-data map 204 across multiple hosts. In such an embodiment, a VM suspended on one host may be resumed on another host, using the key-data map shared between the hosts. In some embodiments, a shared access mechanism may be used to share access of key-data map across multiple hosts, for example, using a clustered file system (e.g., ZFS, or VMFS™ made available from VMware, Inc. of Palo Alto, Calif.).

Accordingly, embodiments of the present disclosure provide a technique for suspending and resuming a virtual machine that greatly reduces the amount of disk space required to persist state of the virtual machine. By way of example, if there are N VMs running on host computer 100, each VM having a vRAM with a size of $X_i$ GB, traditional approaches would require an amount of data written to persistent storage (e.g., hard disk) during the suspend process as:

$$\sum_{i=1}^{N} X_i$$

In contrast, using a technique according to the present disclosure, assuming each VM has an amount of unique data $X_1$-$Y_1$, the amount of total data written to the key-data map will be:

$$\sum_{i=1}^{N} (X_i - Y_i)$$

where the amount of write I/O operations saved is:

$$\sum_{i=1}^{N} Y_i$$

Further, as another example, assuming there are M hosts running N VMs, each VMs has an amount of vRAM as $X_{ij}$ GB, traditional approaches to suspending VMs would require an amount of data written to persistence storage as:

$$\sum_{i=1}^{M} \sum_{j=1}^{N} X_{ij}$$

In contrast, using a technique according to the present disclosure, where the key-data map is shared across hosts, and again assuming each VM has an amount of unique data $X_{ij}$-$Y_{ij}$, then the amount of total data written to the key-data map will be $$\sum_{i=1}^{M} \sum_{j=1}^{N} (X_{ij} - Y_{ji})$$

where the amount of I/O savings that can be achieved is:

$$\sum_{i=1}^{M} \sum_{j=1}^{N} Y_{ij}$$

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for suspending a virtual machine executing in a physical host, the method comprising:
   suspending execution of a virtual machine having data stored in a virtual memory space allocated for the virtual machine;
   dividing the data in the virtual memory space into a plurality of blocks;
   determining a plurality of keys corresponding to data in the plurality of blocks;
   storing the plurality of keys in a key-data map that associates each of the plurality of keys with corresponding data from the plurality of blocks; and
   generating, on a storage device, a saved state file comprising the plurality of keys, wherein the saved state file represents a state of the virtual memory space of the suspended virtual machine.

2. The method of claim 1, wherein storing the plurality of keys in the key-data map further comprises:
   querying the key-data map to determine whether data of a first block associated with a first key of the plurality of keys is already stored within the key-data map; and
   responsive to determining the data is not already stored within the key-data map, storing the data of the first block and the associated first key within the key-data map.

3. The method of claim 1, wherein determining the plurality of keys corresponding to data in the plurality of blocks further comprises:
   generating, for each of the plurality of blocks, a hash value based on data in a corresponding one of the plurality of blocks.

4. The method of claim 1, wherein the virtual memory space is organized in a plurality of memory pages, wherein each of the plurality of blocks have a same size as a memory page of the virtual memory space.

5. The method of claim 1, further comprising:
   retrieving, from the storage device, the plurality of keys from the saved state file representing the state of the virtual memory space of the suspended virtual machine;
   retrieving data of the plurality of blocks associated with the plurality of keys from the key-data map;
   loading the retrieved data into the virtual memory space allocated for the virtual machine; and
   resuming operation of the virtual machine.

6. The method of claim 5, wherein retrieving data corresponding to the plurality of blocks from the key-data map based on the plurality of keys further comprises:
   determining a second virtual machine executing on the host has at least one memory page having same data contents as at least one of the plurality of blocks based on a corresponding key; and
   loading a reference to the memory page into the virtual memory space instead of data from the key-data map.

7. The method of claim 5, wherein resuming operation of the virtual machine further comprises resuming operation of the virtual machine on a second physical host having a second key-data map, the second physical host different from the physical host on which the virtual machine was suspended; and
   wherein retrieving data corresponding to the plurality of blocks from the key-data map based on the plurality of keys further comprises:
   determining data of a first block of the plurality of blocks associated with a first key of the plurality of keys is not available in the second key-data map of the second physical host; and
   responsive to determining the data is not available, retrieving the data of the first block associated with the first key from the key-data map on the physical host on which the virtual machine was suspended.

8. The method of claim 1, further comprising:
   after generating the saved state file comprising the plurality of keys, suspending operation of the virtual machine; and
   launching a background thread that copies data of the plurality of blocks from the key-data map into the file using the plurality of keys stored in the saved state file.

9. The method of claim 1, wherein the key-data map is persisted in a solid-state storage device.

10. The method of claim 1, wherein the key-data map is shared for a plurality of virtual machines executing on the host.

11. The method of claim 1, wherein the key-data map is shared between the physical host and a second physical host, each physical host having a plurality of virtual machines executing thereon.

12. A non-transitory computer readable storage medium having stored thereon computer readable program code for suspending a virtual machine executing in a physical host, wherein execution of the computer readable program code by one or more processors of a computer system, wherein the computer readable program code comprise:
   program code to suspend execution of a virtual machine having data stored in a virtual memory space allocated for the virtual machine;

program code to divide the data in the virtual memory space into a plurality of blocks;

program code to determine a plurality of keys corresponding to data in the plurality of blocks;

program code to store the plurality of keys in a key-data map that associates each of the plurality of keys with corresponding data from the plurality of blocks; and program code to generate a saved state file comprising the plurality of keys, wherein the saved state file represents a state of the virtual memory space of the suspended virtual machine.

13. The non-transitory computer readable storage medium of claim 12, wherein program code to store the plurality of keys in the key-data map further comprises:

program code to query the key-data map to determine whether data of a first block associated with a first key of the plurality of keys is already stored within the key-data map; and program code to, responsive to determining the data is not already stored within the key-data map, store the data of the first block and the associated first key within the key-data map.

14. The non-transitory computer readable storage medium of claim 12, wherein program code to determine the plurality of keys corresponding to data in the plurality of blocks further comprises:

program code to generate, for each of the plurality of blocks, a hash value based on data in a corresponding one of the plurality of blocks.

15. The non-transitory computer readable storage medium of claim 12, wherein the virtual memory space is organized in a plurality of memory pages, wherein each of the plurality of blocks have a same size as a memory page of the virtual memory space.

16. The non-transitory computer readable storage medium of claim 12, further comprising:

program code to retrieve the plurality of keys from the saved state file representing the state of the virtual memory space of the suspended virtual machine;

program code to retrieve data of the plurality of blocks associated with the plurality of keys from the key-data map;

program code to load the retrieved data into the virtual memory space allocated for the virtual machine; and program code to resume operation of the virtual machine.

17. The non-transitory computer readable storage medium of claim 16, wherein the program code to retrieve data corresponding to the plurality of blocks from the key-data map based on the plurality of keys further comprises:

program code to determine a second virtual machine executing on the host has at least one memory page having same data contents as at least one of the plurality of blocks based on a corresponding key; and program code to load a reference to the memory page into the virtual memory space instead of data from the key-data map.

18. The non-transitory computer readable storage medium of claim 12, further comprising:

program code to, after generating the saved state file comprising the plurality of keys, suspend operation of the virtual machine; and program code to launch a background thread that copies data of the plurality of blocks from the key-data map into the file using the plurality of keys stored in the saved state file.

19. The non-transitory computer readable storage medium of claim 12, wherein the key-data map is shared for a plurality of virtual machines executing on the host.

20. The non-transitory computer readable storage medium of claim 12, wherein the key-data map is shared between the physical host and a second physical host, each physical host having a plurality of virtual machines executing thereon.

21. A computer system for suspending a virtual machine executing in the computer system, the computer system comprising:

a first storage device having a key-data map;

a second storage device; and a processor programmed to carry out the steps of:

suspending execution of a virtual machine having data stored in a virtual memory space allocated for the virtual machine;

dividing the data in the virtual memory space into a plurality of blocks;

determining a plurality of keys corresponding to data in the plurality of blocks;

storing the plurality of keys in the key-data map stored on the first storage device that associates each of the plurality of keys with corresponding data from the plurality of blocks; and generating, on the second storage device, a saved state file comprising the plurality of keys, wherein the saved state file represents a state of the virtual memory space of the suspended virtual machine.

22. The computer system of claim 21, wherein the processor programmed to store the plurality of keys in the key-data map is further programmed to carry out the steps of:

querying the key-data map to determine whether data of a first block associated with a first key of the plurality of keys is already stored within the key-data map; and responsive to determining the data is not already stored within the key-data map, storing the data of the first block and the associated first key within the key-data map.

23. The computer system of claim 21, wherein the processor programmed to determine the plurality of keys corresponding to data in the plurality of blocks is further programmed to carry out the steps of:

generating, for each of the plurality of blocks, a hash value based on data in a corresponding one of the plurality of blocks.

24. The computer system of claim 21, wherein the virtual memory space is organized in a plurality of memory pages, wherein each of the plurality of blocks have a same size as a memory page of the virtual memory space.

25. The computer system of claim 21, wherein the processor is further programmed to carry out the steps of:

retrieving, from the second storage device, the plurality of keys from the saved state file representing the state of the virtual memory space of the suspended virtual machine;

retrieving data of the plurality of blocks associated with the plurality of keys from the key-data map;

loading the retrieved data into the virtual memory space allocated for the virtual machine; and resuming operation of the virtual machine.

26. The computer system of claim 25, wherein the processor programmed to retrieve data corresponding to the plurality of blocks from the key-data map based on the plurality of keys is further programmed to carry out the steps of:

determining a second virtual machine executing on the computer system has at least one memory page having same data contents as at least one of the plurality of blocks based on a corresponding key; and loading a reference to the memory page into the virtual memory space instead of data from the key-data map.

27. The computer system of claim 21, wherein the processor is further programmed to carry out the steps of:
   after generating the saved state file comprising the plurality of keys, suspending operation of the virtual machine; and
   launching a background thread that copies data of the plurality of blocks from the key-data map into the file using the plurality of keys stored in the saved state file.

28. The computer system of claim 21, wherein the first storage device comprises a solid-state storage device.

29. The computer system of claim 21, wherein the key-data map is shared for a plurality of virtual machines executing on the computer system.

* * * * *